June 2, 1953     H. P. BOSWAU     2,640,895
IMPULSE-RESPONSIVE STEPPING DEVICE ACTUATED BY MAGNETIC TORQUE
Filed Oct. 24, 1947     4 Sheets-Sheet 1

Inventor:
Hans P. Boswau,
By his Attorney

June 2, 1953 H. P. BOSWAU 2,640,895
IMPULSE-RESPONSIVE STEPPING DEVICE ACTUATED BY MAGNETIC TORQUE
Filed Oct. 24, 1947 4 Sheets-Sheet 2

Inventor:
Hans P. Boswau,
By *[signature]*
his Attorney

June 2, 1953   H. P. BOSWAU   2,640,895
IMPULSE-RESPONSIVE STEPPING DEVICE ACTUATED BY MAGNETIC TORQUE
Filed Oct. 24, 1947   4 Sheets-Sheet 3

Inventor:
Hans P. Boswau,
By
his Attorney

June 2, 1953  H. P. BOSWAU  2,640,895
IMPULSE-RESPONSIVE STEPPING DEVICE ACTUATED BY MAGNETIC TORQUE
Filed Oct. 24, 1947  4 Sheets-Sheet 4

Inventor.
Hans P. Boswau,
By
his Attorney

Patented June 2, 1953

2,640,895

UNITED STATES PATENT OFFICE 2,640,895

IMPULSE-RESPONSIVE STEPPING DEVICE ACTUATED BY MAGNETIC TORQUE

Hans P. Boswau, Dundee, Ill.

Application October 24, 1947, Serial No. 781,816

12 Claims. (Cl. 200—105)

This invention relates to selecting, switching and positioning devices for numerous purposes and for use in numerous systems including, for example, communication systems, indicating and signalling systems or the like, and is particularly concerned with a new driving device for intermittently actuating an operating member in increments of angular and axial displacement to dispose selecting, switching, indicating or control means carried by such member successively in predetermined angular positions, in which such means performs selective switching, signalling, indicating or other desired control functions.

The principal object of the invention is to produce an electromagnetic impulse-responsive step-by-step driving device which utilizes magnetic torque for driving a rotatable operating member in the absence of mechanical means such as ratchets or the like. The new device may be descriptively termed a "stepping device without a ratchet" or may be alternatively designated as a "magnetic torque or ratchet switch."

This principal object is accomplished by the provision of a stepping magnet comprising a pole piece or pole pieces forming arcuately disposed angularly extending stationary teeth for magnetic coaction with similar angularly extending teeth carried by a rotatable and axially movable armature. The armature is resiliently axially biased in a direction perpendicular to the plane of the field formed by the pole piece or pole pieces and is kept in normal axial position partially retracted from such field with its teeth in axially overlapping relationship with the corresponding stationary teeth of the pole piece or pole pieces. Flux is created across the gap between the stationary teeth and the teeth of the armature responsive to the energization of an associated coil, displacing the armature by magnetic torque in a composite axial and angular motion, in accordance with the angle or pitch of its teeth, twisting it in place into its actuated terminal position in which its teeth are radially or transversely in face-to-face alignment with the stationary teeth of the pole piece or pole pieces. The armature is thus angularly advanced or rotated by a definite amount. Upon cessation of the energization of the coil and consequent cessation of the magnetic torque, the armature moves in straight-line axial motion to its normal axial position, thereby aligning its teeth with the angularly successive stationary teeth, ready to move axially and angularly in face-to-face alignment therewith, as before, responsive to subsequent energization of the coil. Successive current impulses delivered to the coil thus advance or rotate the armature step by step. The rotation of the armature as well as its straight-line axial return motion, upon cessation of each current impulse, may be utilized to perform desired selective control or positioning functions.

Other objects and features of the invention are realized by associating with the armature of the new driving device suitable and desired operating means depending on the use to which the device is put. For example, if the device is used as a selector in the nature of a stepping switch, or as a counting chain, or a counting switch, or for numerous control, signalling and switching purposes, the operating means may be in the form of members for selectively actuating contacts to perform desired selecting or switching functions. If the device is to be used as an indicator or counter or the like, the operating means may be a member carrying predetermined indicia, e. g., numerals which are selectively displayed.

The characteristic operation of the new driving device may also be translated into mechanical work. For example, the operating member associated with or operated by the armature may be a shaft carrying radial arms or fingers or the like which are selectively angularly positioned to perform desired control operations, e. g., the selective tripping of operating members or the selective coupling of mechanical elements.

The foregoing and additional objects and features will appear from the detailed description of some embodiments of the invention, which is presented below with reference to the accompanying drawings. In these drawings.

Like parts are designated by like reference numerals throughout the drawings. Known details and elements will be described only to the extent required for conveying an understanding of the invention.

The embodiment shown in Figs. 1-8, inclusive, comprises a stepping magnet generally indicated by S, an armature 25 carrying an operating member generally indicated at 26, pole pieces 36 and 37 for coaction with the armature, and sets of contacts arranged in two piles indicated at 27—28. A spring stop block 29 is provided for holding the contact springs in normal resting positions. Details of the embodiment are described below.

The stepping magnet S comprises an angular frame or yoke member 30 which is secured to the core of the magnet at one end thereof by means of a screw 31. Secured to the other end of the core, by means of a screw 33, is an angular frame or yoke member 32. The inner ends 34—35 of these frame or yoke members are spaced apart and may be arcuately shaped. Associated with the inner end 34 of the member 32 is the pole piece 36, and associated with the inner end 35 of the member 30 is the pole piece 37.

Figure 3:
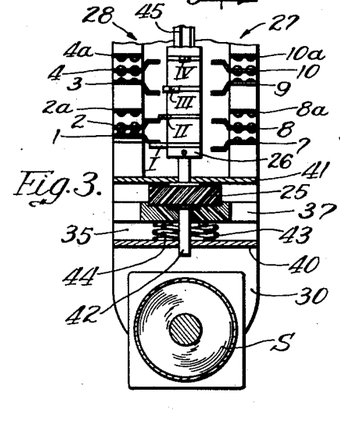
Fig. 3 is a section taken approximately along lines 3—3 in Fig. 2, some of the contacts being omitted.
Figure 4:
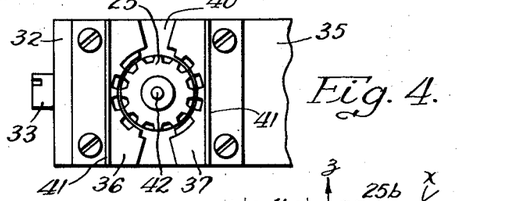
Fig. 4 illustrates a partial diagrammatic plan view of the electromagnetic driving means, as seen when looking in the direction of the arrows along the sectional lines 4—4 in Fig. 1.

The inner end of each of these pole pieces 36—37 is arcuately shaped and is provided with a number of angularly disposed grooves forming angularly directed stationary teeth, as is particularly indicated in Figs. 3 and 4. The inner ends 34—35 of the frame or yoke members 32 and 30 are connected by a nonmagnetic plate 40. The pole pieces 36—37 are connected by a nonmagnetic bridge piece 41.

The armature 25 is a generally cylindrical member provided with peripheral grooves forming angularly disposed teeth for magnetic coaction with the angularly disposed teeth formed in the inner faces of the pole pieces 36—37. A shaft 42 is associated with the armature and journalled at its lower end in the plate 40 and at an intermediate point in the bridge piece 41. Disposed between the armature 25 and the plate 40 are two oppositely coiled coaxially disposed springs 43—44 which bias the armature 25 on its shaft 42 axially in a direction perpendicular to the field formed by the pole pieces 36—37, holding the armature in a normal axial position partially retracted from such field with its teeth in axially overlapping relationship with the stationary teeth of the pole pieces, as indicated in Fig. 3. There are two air gaps, one between the teeth of the armature and the teeth carried by the pole piece 36 and one between the teeth of the armature and the coacting teeth carried by the pole piece 37, as shown in Fig. 4.

Magnetic flux is set up across the gaps between the teeth of the pole pieces 36—37 and the teeth of the armature 25, when the coil of the stepping magnet S is energized by a current impulse delivered thereto, and the armature 25 moves by magnetic torque in a composite motion, axially and angularly, twisting, as it were, into its actuated terminal position between the pole pieces, in which position its teeth, which were normally in axially overlapping relationship with the teeth of the pole pieces, are placed in face-to-face alignment therewith. The axial motion of the armature is against the pressure of the coaxial springs 43—44. The amount of coincident angular rotation of the armature is determined by the number of teeth carried thereby, which coact magnetically with the teeth carried by the pole pieces and by the angle or pitch of such teeth. For example, if there are twelve peripheral grooves on the armature, forming twelve angularly disposed teeth thereon, as shown in Fig. 4, the angular rotation in response to the energization of the stepping magnet S will be 360° divided by 12, or 30°. Upon cessation of the current impulse delivered to the stepping magnet S, the armature 25 is restored to normal in straight-line motion in axial direction by the pressure of the coaxial springs 43—44, thereby placing its teeth in axially overlapping relationship with angularly successive stationary teeth of the pole pieces, ready to move axially and angularly into face-to-face alignment with such stationary teeth, as before, when the magnet is energized by a current impulse subsequently delivered to its coil. The coaxial springs 43—44, in addition to their function to restore the armature in straight-line axial motion to normal axial position, also function in the nature of a detent to control the angular displacement or step-by-step rotation thereof. Separate or additional detent means may, of course, be provided.

Figure 4A:
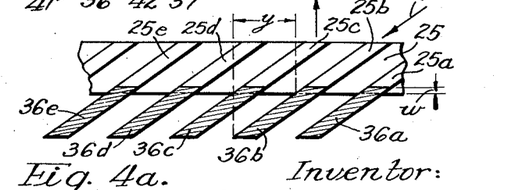
Fig. 4a is a diagram intended to aid in explaining the coaction of the teeth of the armature with the teeth of the pole piece or pole pieces.

The magnetic coaction of the teeth of the armature with the stationary teeth of the pole pieces may be explained more in detail with reference to Fig. 4a.

This figure shows a developed view of a portion of the armature 25 carrying the teeth 25a—25e, and in sectional view the teeth 36a—36e of the pole piece 36. The armature teeth are disposed in back of the teeth 36a—36e of the pole piece 36, spaced therefrom by an air gap, and are in normal position in overlapping relationship therewith, as shown. The amount of the overlap is indicated at w. The teeth are in this example disposed at an angle of approximately 35°. When flux is set up across the air gap, in a direction extending perpendicular to the plane of the drawing Fig. 4a, responsive to a current impulse delivered to the coil S of the device, the lines of force extend from the teeth 36a—36e of the pole piece across the gap to the teeth 25a—25e of the armature, through the armature and then across the second gap to and through the second pole piece 37 (Figs. 1–4), causing displacement of the armature, as represented in Fig. 4a, in the direction indicated by the arrow x, thus moving the armature teeth into face-to-face alignment with the corresponding teeth of the pole piece. The armature tooth 25b moves in this manner into face-to-face alignment with the pole piece tooth 36b, being thereby displaced by an angular amount y and axially by an amount corresponding to its height less the overlap w. All other armature teeth move similarly relative to the corresponding pole piece teeth with which they were initially in axial overlapping relationship.

Upon cessation of the current impulse and consequent cessation of the magnetic flux, the armature 25 restores to normal in straight-line axial direction, perpendicularly upwardly, as seen in the drawing Fig. 4a, as indicated by the arrow z. The armature tooth 25b is thereby placed in axially overlapping relationship with the pole piece tooth 36c; that is to say, it assumes the position in which the armature tooth 25c is shown in the drawing. All other armature teeth are similarly moved into preparatory position with the corresponding angularly successive teeth of the pole piece, ready to move into face-to-face alignment therewith when the next current impulse is delivered to the coil. Successive energization of the magnet thus causes successive angular displacement of the armature in accordance with the arrow x followed by release thereof in a direction indicated by the arrow z, to place the armature teeth in preparatory position with respect to the angularly successive pole piece teeth, thereby angularly rotating the armature step by step by angular amounts indicated by the distance y.

Figure 5:
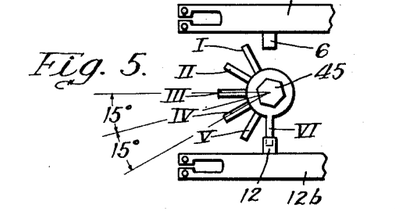
Figs. 5, 6 and 7 present explanatory diagrams to illustrate the successive actuation of the contacts of the device shown in Figs. 1 to 4.
Figure 6:
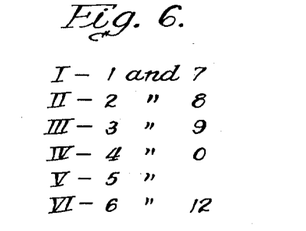

The shaft 42 associated with the armature 25 extends axially therefrom and carries a hexagon 45 on which are mounted a plurality of members forming contact actuating fingers indicated from bottom to top by reference numerals I—VI. Each member may be a stamping made of insulating material having a ringlike central portion and an arm or finger radially extending therefrom. The stampings are mounted on the hexagon 45, equally spaced thereon by suitable spacer means, as shown in Fig. 3, the arrangement being such that the median center line of each finger is displaced by 15° from the center line drawn perpendicular to the flat of the hexagon, as indicated in Fig. 5. Each alternate member is placed on the hexagon with its face up, and the fingers extending therefrom are in this manner angularly displaced by 30° corresponding to the 30° angular displacement of the armature responsive to a current impulse delivered to the stepping magnet. The arrangement thus requires only a single stamping for the various actuating members. It is understood, of course, that the stampings forming the contact-actuating fingers may be made of conductive material and may be mounted in insulated relationship. The equal spacing of the stampings forming the contact-actuating fingers is accomplished by the provision of crimped ears extending from the movable contact springs in a manner which will be presently described.

The contact pile 27 comprises the sets of contact springs 7—8—8a, 9—10—10a and 12a—12—12b. The contact pile 28 comprises the sets of contact springs 1—2—2a, 3—4—4a and 5—6—6a. The contact springs are provided with ears such as 38, 39 (see Fig. 2) resting on shelves carried by the spring stop block 29. The contact springs 1—2—3—4—5—6 of the spring pile 28 and the contact springs 7—8—9—10—12 of the contact pile 27 are each provided with a crimped actuating ear for engagement selectively by the actuating fingers I—VI associated with the armature shaft. These crimped actuating ears are omitted in the case of springs 2a, 4a and 6a of the contact pile 28 and also in the case of the springs 8a, 10a, 12a and 12b of the contact pile 27. The contact springs provided with the crimped actuating ears are thus relatively movable by engagement with corresponding actuating fingers I—VI, and the remaining contact springs are relatively fixed for contact-making coaction therewith.

Figure 1:
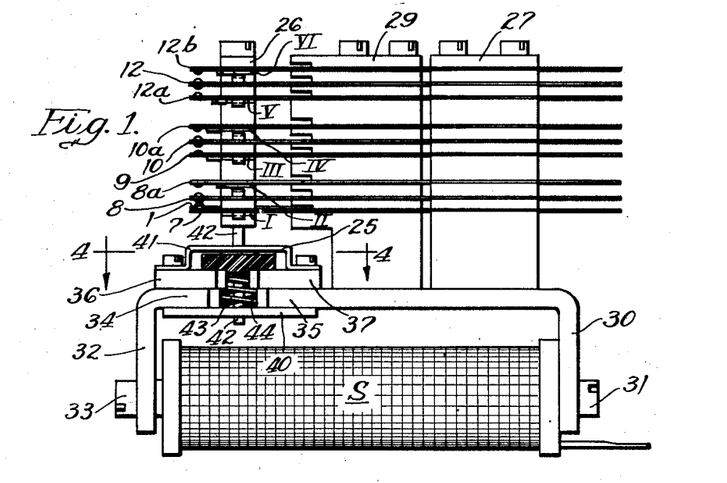
Fig. 1 shows in diagrammatic representation an elevational side view of an embodiment of the invention for use, for example, as a selector, or as a counting chain or the like, in communication, switching or signalling systems.
Figure 2:
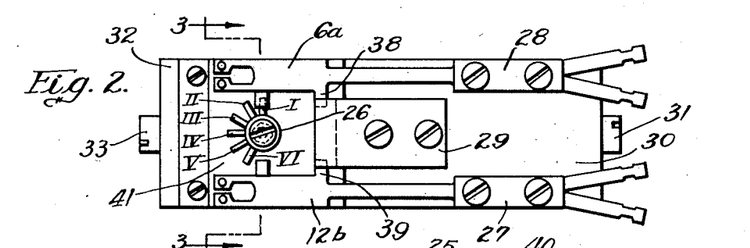
Fig. 2 represents a diagrammatic top view of the device shown in Fig. 1.
Figure 8:
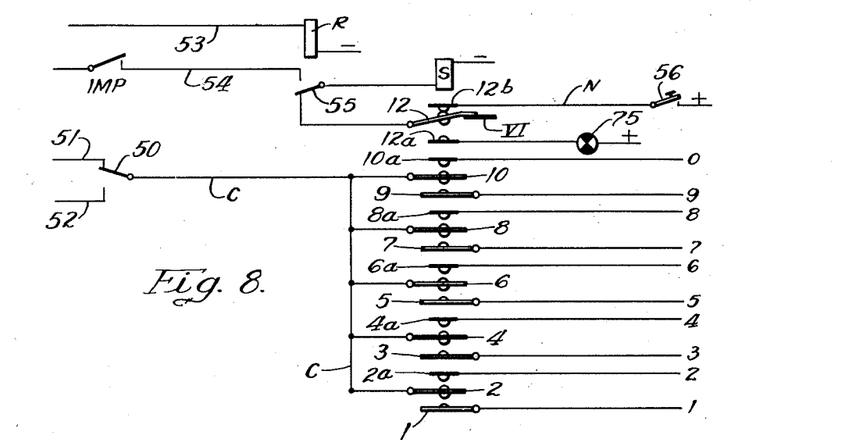
Fig. 8 shows a simple circuit diagram illustrating how the device, Figs. 1 to 7, may be used as a counting chain or as a selector switch.

The provision of the crimped ears on the relatively movable contact springs makes it possible to space the contact-actuating fingers I—VI equally on the hexagon 45, as previously discussed and as indicated in Fig. 3. It will be readily realized that, if such crimping of the ears were omitted, an equal spacing of the actuating fingers could not be obtained because the distance, for example, between the operating portions of the contact springs 1 and 2 is less than the distance between the operating portions of the springs 2 and 3. Identical conditions obtain with the successive sets of contact springs. Fig. 8 shows the contact springs diagrammatically superposed in a vertical row and for convenience substantially equally spaced. Their structural relationship is, however, as indicated in Figs. 1 and 3.

Figure 7:
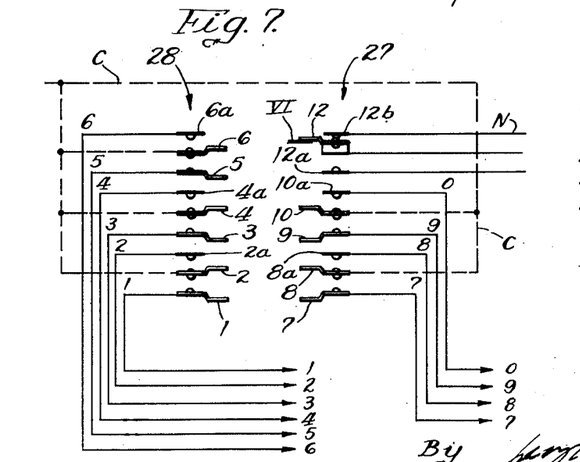

It is assumed, in the illustrated embodiment, as diagrammatically indicated in Figs. 7 and 8, that the relatively movable contact springs 2, 4, 6, 8 and 10 are wired in multiple to a common conductor C and that each of the contact springs 1—2a, 3—4a, 5—6a, 7—8a and 9—10a is associated with an individual conductor or line. These lines or individual conductors are indicated by numerals "1" to "0." The remaining set of contact springs, comprising the springs 12, 12a and 12b, is employed for off-normal and for control purposes.

In the normal or home position of the device the uppermost contact-actuating finger VI is positioned underneath the crimped ear extending from the relatively movable contact spring 12, as shown in Figs. 5, 7 and 8. The armature 25 is biased in axial direction by the pressure of the springs 43—44, holding the operating member 26 and with it the contact-actuating fingers I—VI in normal axial home position. In such normal home position, the actuating finger VI holds the spring 12 in its operated flexed position in contact engagement with the spring 12b. All other contact springs are in normal position.

When it is now assumed that current impulses are successively delivered to the coil of the stepping magnet S, we will obtain operation of the contact springs by the contact fingers I—VI, as follows:

Upon delivery of the first impulse and consequent energization of the coil of the stepping magnet S, flux is set up across the gaps between the teeth carried by the pole pieces 36—37 and the teeth carried by the armature 25, attracting the armature and displacing it, as explained before, in a composite motion in axial direction, and at the same time angularly, until the teeth carried by the armature are in face-to-face alignment with the corresponding teeth of the pole pieces. The armature is now in its actuated terminal position.

It has been assumed that there are twelve peripheral angular teeth on the armature 25, and the amount of angular displacement of the armature, responsive to the first current impulse, is therefore 30°. The contact finger VI slips out from underneath the actuating ear extending from the contact spring 12, and this spring drops into contact-making engagement with the contact spring 12a. The actuating finger I is likewise rotated by 30°, from its normal position shown in Fig. 5 into preparatory or selecting position, underneath the actuating ear extending from contact spring 1.

Upon cessation of the first current impulse delivered to the stepping magnet, the armature 25, and with it the operating member 26 and all the contact-actuating fingers I—VI, move in straight-line axial direction and, inasmuch as the actuating finger I is positioned underneath the actuating ear of contact spring 1, this contact spring is now flexed or displaced upwardly, into contact-making engagement with contact spring 2, as indicated in Figs. 1 and 3. The common conductor C shown in Figs. 7 and 8 is thus extended to the line 1. The teeth of the armature are now in axially overlapping relationship with the angularly successive teeth of the pole pieces, as previously explained in detail.

When the next impulse is delivered to the stepping magnet, the armature is again attracted in a composite motion axially and angularly to remove the actuating finger I from alignment with the ear extending from spring 1, releasing spring 1 and thus interrupting the connection between line 1 and the common conductor C. The actuating finger II is at the same time positioned underneath the ear extending from the contact spring 2. When the second impulse ceases, the armature, and with it the actuating fingers I—VI, again move in straight-line axial motion into normal axial position, and the finger II, being positioned underneath the ear extending from contact spring 2, lifts this contact spring into contact-making engagement with spring 2a, thus connecting the common conductor C, shown in Figs. 7 and 8, with line 2.

Successive impulses delivered to the stepping magnet actuate the armature and the contact-actuating fingers in a similar manner. The sequence of contact operation is apparent from the diagram, Fig. 6, taken in conjunction with Figs. 7 and 8. Summarizing the sequence: The contact-actuating finger I is placed in preparatory or selecting position relative to spring 1 upon attraction of the armature responsive to the first current impulse and actuates contact spring 1 upon cessation of the first impulse. The contact finger 1 also actuates contact spring 7 upon cessation of the seventh current impulse. Contact-actuating fingers II, III and IV actuate the contact springs 2 and 8, 3 and 9, 4 and 6, respectively, upon cessation of the second and eighth, third and ninth, fourth and tenth impulses, respectively.

Putting the operation in different words, contact springs 1—6 are successively operated by actuating fingers I—VI in response to the first six impulses delivered to the stepping magnet S, which corresponds to angular advance, step by step, of the armature from 0° position to 180° position. The contact springs 7, 8, 9, 10 and 12 are successively actuated by the same six contact-actuating fingers I—VI on the second half of the step-by-steplike rotation of the armature from 180° to 360°. The device illustrated in Figs. 1 to 8 is thus a "12-position" switch providing for ten line-connecting positions and for two (normal and off) control positions.

It will be observed that there are two distinct phases in the operation of each contact, namely, selective positioning of the corresponding actuating finger relative to a contact spring upon attraction of the armature, which corresponds to the contact selection, and subsequent actuation of the selected contact responsive to cessation of magnetic torque and consequent return of the armature to normal axial position.

With the foregoing explanations in mind, the circuit diagram, Fig. 8, will be easily understood. The diagram shows the elements of the device when used as a counting chain or as a selector operating in the nature of a stepping switch. Numerals 1 to 0 indicate a set of ten outgoing conductors. The simple function of the switch is assumed to be the successive connection of a line such as 52 with any one of the conductors 1 to 0. Conductor 51 may be a test conductor to establish the busy or idle condition of a selected outgoing conductor. The contacts actuated by the stepping magnet S of the switch are marked by numerals corresponding to those used in the previously described figures, and particularly Fig. 7. Contacts 2, 4, 6, 8 and 10, are accordingly connected to the common conductor C terminating in the contact 50 of a switching relay (not shown) which is adapted to remove the common conductor C from engagement with the test conductor 51 and switch it into engagement with the line conductor 52. This operation occurs at the conclusion of the line-selecting operation. Relay R is a restoring relay which is actuated over the conductor 53 when the switching mechanism is seized. The impulse conductor is indicated by numerals 54, and "IMP" indicates an impulse contact. Numeral 55 is a break-make contact actuated by the restoring relay R. The battery connections are indicated by plus and minus signs, plus being referred to as "ground" and minus as "battery."

The contact-actuating finger VI is in normal home position of the device underneath the crimped ear extending from the off-normal contact spring 12, maintaining contact-making engagement between the contact springs 12 and 12b. The normal conductor N connects with a suitable switch 56, which may be a push button or the like, provided for test purposes. The contact spring 12a is connected with an interrupter 57 which is adapted to deliver impulses at a predetermined rate, for example, ten impulses per second.

Assuming now that the device is in the normal home position shown in Fig. 8, and that it is desired to make a test, the push button 56 is depressed, thus connecting ground by way of the normal conductor N and contacts 12b, 12, 55 to the stepping magnet S. The armature of the stepping device (not shown in Fig. 8) now is angularly and axially displaced, as described, removing the actuating finger VI from engagement with the ear of the spring 12, thus allowing the spring to drop into contact-making engagement with contact spring 12a, disconnecting the push button 56 and connecting the interrupter 57 with the stepping magnet S. The actuating finger I is at the same time placed in selecting position relative to contact spring 1. Upon cessation of the first current impulse delivered by depressing the push button 56, the actuating finger I, incident to the restoring motion of the armature in axial direction, actuates contact spring 1 to establish contact with spring 2, thus connecting line 1 with the common conductor C for a desired test or supervisory purpose. Successive impulses delivered by the interrupter 75 successively connect the conductors 2, 3 to 0 with the common conductor C in a manner already described. The twelfth impulse positions the contact finger VI underneath the ear projecting from contact spring 12, and upon cessation of the twelfth impuse the armature moves in axial straight-line motion into its normal home position, thus causing separation of contacts 12 and 12a to disconnect the interrupter 57. The device is now again at rest in its home position, with the contacts as shown in Fig. 8.

When it is assumed that the device is used for the purpose of successively connecting the line 51 with the conductors 1—0, or for selecting one of the conductors 1—0, we first energize relay R, which places its contact 55 in alternate position, connecting the stepping magnet S with the impulse conductor 54. Successive impulses delivered by the actuation of the impulse contact IMP again cause successive actuation of the contacts, as described, connecting the conductors 1—0 successively with the common conductor C and by way of contact 50 with the test conductor 51. Contact spring 12 is released to normal position into engagement with contact 12a by the angular displacement of contact finger VI incident to delivery of the first impulse, thus preparing the homing circuit for the stepping magnet S under control of the interrupter 57. Upon seizure of the selected conductor, which may be one of the conductors 1—0, the switching relay (not shown) energizes, placing contact 50 in alternate position to switch through the line 52 to the selected conductor.

When it is desired to restore the switch to normal, the relay R will be deenergized to place its contact 55 in normal position, as shown. Impulses are now delivered to the stepping magnet S by the interrupter 57 to actuate the armature and therewith the actuating fingers I to VI, as described, until finally the contact spring 12 is displaced into the position shown in Fig. 8, upon cessation of the twelfth current impulse, which interrupts the circuit to the interrupter 57. The switch is now again in normal home position.

The advantages which result from the structure described in the foregoing, as compared with pawl and ratchet-operated step-by-step switches, will be apparent. Ratchets and the like are eliminated and friction, as well as wear and tear caused by ratchets, is absent. The elimination of frictional losses assures quicker and more accurate operation with less input. The device is simpler and requires fewer parts, thereby facilitating manufacture and reducing the cost of the unit product. The new device may be used for numerous operations where a pawl and ratchet switch would not meet requirements. The useful life of the new switch will be lengthened, due to absence of wear and tear of moving parts, the operation being wholly electromagnetic.

Changes may, of course, be made without affecting the operating principles involved. For example, the armature may be provided with axial holes to reduce its weight and thereby its inertia. The armature as well as the pole pieces may be laminated. More or less contact sets and coacting contact-actuating fingers may be provided and the contact combinations may be different according to the purpose for which the device is made.

Figure 9:
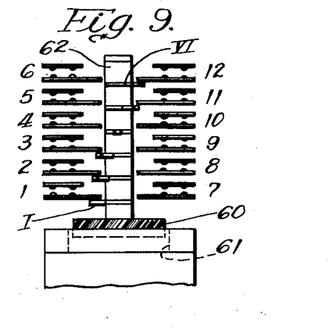
Fig. 9 is a diagrammatic view showing a modification of the contact arrangement for use in a device of the type shown in Figs. 1-8, inclusive.
Figure 10:
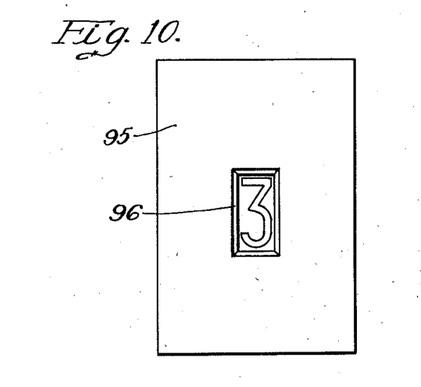
Fig. 10 illustrates an elevational front view of a numerical indicator employing the principles of the present invention.
Figure 11:
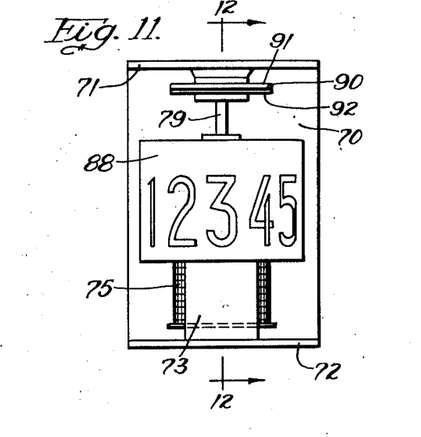
Fig. 11 shows in diagrammatic manner the indicator of Fig. 9 when the cover is removed.
Figure 12:
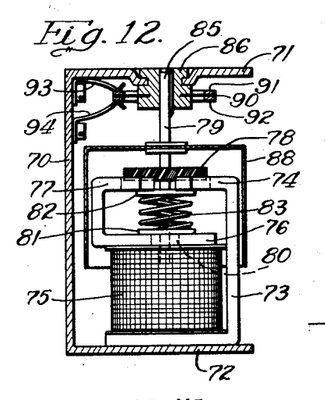
Fig. 12 illustrates a side view of the indicator, Figs. 10 and 11, with some parts in section taken approximately along lines 12—12 in Fig. 11.

Fig. 9 shows in diagrammatic representation a front end view of the essential parts of a modified embodiment. This embodiment comprises a step-by-step driving mechanism, just like the embodiment previously described, having an angularly grooved or notched armature 60 operating in a magnetic field 61 formed by pole pieces, the faces of which are arcuately shaped and likewise provided with angular grooves to form angularly disposed teeth for magnetic coaction with the angular teeth on the armature. Axially extending from the armature is the operating member 62 carrying six radially extending actuating arms or fingers I—VI, only the first and the sixth fingers being marked by reference numerals. These fingers are again successively angularly displaced on the operating member 62 by amounts corresponding to the successive angular displacement or rotation of the armature responsive to delivery of an impulse to the stepping magnet of the device. The means for holding the armature in normal axial position are omitted in Fig. 9. They may correspond to the restoring provisions described in connection with the embodiment Figs. 1–8.

The difference between the embodiment, Fig. 9, and the one explained in connection with Figs. 1–8, resides in the arrangement of the sets of contacts. There are twelve sets of make contacts, numbered 1–12, inclusive, each set comprising two contact springs, one of which is relatively movable for actuation by a corresponding actuating finger on the operating member 62 and the other of which is relatively fixed for contact-making engagement with its associated movable spring. The total number of contact springs employed in this case is twenty-four, there being twelve springs in each pile. The showing of Fig. 9 indicates the advantage resulting from a contact arrangement such as described in the first embodiment which also has twelve positions, but employs only eighteen contact springs, nine in each pile, as compared with twelve contact springs in each pile, as shown in Fig. 9. The device may be used to perform switching functions similar to the switching functions that may be performed by the device shown in Figs. 1–8.

The embodiment illustrated in Figs. 10–13 will be described next, showing the manner in which the new magnetic torque drive device may be employed as a numerical indicator.

The structure comprises a frame forming a rear wall 70, a top plate 71 and bottom plate 72. Secured to the bottom plate 72 is the heel piece or yoke 73 forming the pole piece 74. The heel piece is associated with and secured to the core of the magnet structure which is surrounded by the coil 75. The core is suitably secured to the bottom plate 72. To the free inner end of the core is secured the angular member 76 forming the pole piece 77. The inner faces of these pole pieces 74 and 77 are again arcuately shaped and angularly grooved, as in the former case. An armature 78 is provided which is again of generally cylindrical shape and provided with peripheral angularly extending grooves forming angularly directed teeth for magnetic coaction with the angular teeth of the pole pieces 74 and 77. The armature carries a shaft 79 which extends axially from it on either side. The shaft is journalled at its lower end in a suitable bearing 80 provided in the member 76 or in the core of the magnet structure. Shallow cups 81—82 may be provided for holding the free ends of two oppositely coiled coaxial springs generally indicated at 83 which constitute the means for biasing the armature in normal axial position and serving in the nature of a detent, thus taking the place of the springs 43—44 of the previously described structure. The cup 82 may be secured to the shaft 79 on the armature. This cup may be omitted, if desired, and the springs may engage the armature as in the first described case, or may contact a suitable spacer washer associated with the armature. At its other end 85 (Fig. 12) the shaft is splined to a bushinglike journal member 86 which is rotatably mounted in the top wall 71 of the frame. Secured to the shaft is a drumlike operating member 88 carrying numerals, as particularly shown in Fig. 11.

Figure 13:
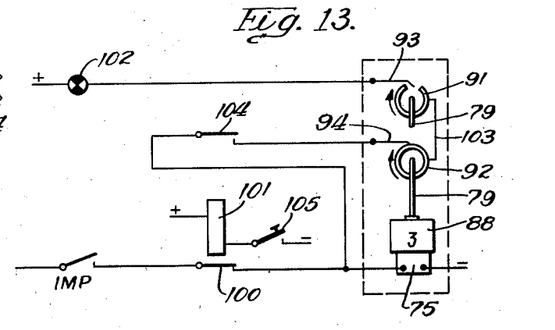
Fig. 13 presents an elementary circuit diagram illustrating how the indicator shown in Figs. 10-12 may be actuated.

The bushinglike journal member 86 carries an insulating disk 90 supporting an arcuate contact strip 91 and a circular ringlike contact strip 92. These contact strips are conductively interconnected, as shown in Fig. 13. Two wipers or brushes 93—94 are provided, the wiper 93 engaging the arcuate contact strip 91 and the wiper 94 engaging the circular contact strip 92. The contact strips 91—92, with their associated wipers 93—94, constitute control contact means in general corresponding to the off-normal control contacts 12, 12a and 12b of the previously described structure. It is understood, of course, that the wipers 93—94 are suitably insulated from the frame of the device.

The operation is as follows:

Assuming that the device is in normal home position, and further assuming that current impulses are delivered to the coil 75, we will obtain upon delivery of the first current impulse attraction of the armature 78 with its shaft 79, in a composite motion angularly and axially, twisting by magnetic torque into the magnetic field set up between the pole pieces 74 and 77, until the angular teeth of the armature are in face-to-face alignment with corresponding angular teeth of the pole pieces. This attraction or displacement of the armature is against the pressure of the springs 83 and is, of course, similar to the displacement described in connection with the armature 25 of the previous embodiment. The drum 88, being connected with the shaft 79, is displaced with it, axially downwardly, as shown in the drawings, and is at the same time angularly rotated or advanced to its next higher numerical position. The shaft 79, being splined to the journal bushing 86, is able to move axially with respect thereto and transmits the angular motion to the bushing, thus rotating the bushing by an angular amount corresponding to the amount of angular displacement of the armature. Upon cessation of the first impulse, the armature 78, together with the shaft 79 and the drumlike operating member 88 carrying the numerals, moves in straight-line axial motion to its normal axial position. The drumlike operating member 88 now displays its next higher numeral through the sight opening 96 of the cover 95. Successive impulses result in successive attraction of the armature and subsequent axial release in a similar manner, until the device displays the desired numeral.

The operation may be briefly summarized with reference to the circuit diagram, Fig. 13, assuming that the indicator is in its normal home or "0" position. Impulses are delivered to the coil 75 of the indicator by the impulse contact IMP over the resting contact 100 of the restoring relay 101. Upon delivery of the first impulse, the insulating disk 90 with its contact strips 91—92, is rotated, thus connecting the interrupter 102 by way of wiper 93 and contact strip 91, interconnecting conductor 103, contact strip 92 and wiper 94, to the normally open contact 104 of the restoring relay 101. This prepares the homing circuit for the device to restore it to "0" position from any position to which it may have been advanced. The drum 88 is at the same time angularly advanced to position "1." Upon cessation of the first current impulse, the armature moves in straight-line motion to its normal axial position, aligning the numeral "1" on the drum 88 with the sight opening 96 in the cover 95 to display such numeral. Successive impulses operate the device in similar manner. It is thus possible to display desired numerals selectively through the sight opening of the device.

When the device is to be restored to normal, the switch 105, which may be a contact of a suitable relay or a push button or the like, is actuated, connecting battery to the restoring relay 101 which opens its resting contact 100 and closes its make contact 104. Impulses from the interrupter 102 are now delivered by way of wiper 93, arcuate contact strip 91, conductor 103, circular contact strip 92, wiper 94, and closed contact 104 to the coil 75 of the device, to advance the shaft 79 and therewith the drum-like member 88 step by step until the home position is reached, when the wiper 93 encounters the gap between the free ends of the arcuate contact strip 91. The interrupter 102 is thus disconnected and the device is again at rest in its "0" or home position.

It will be seen from the foregoing explanations that the advantages mentioned in connection with the first described structure are fully present in case of the indicator shown in Figs. 10–13.

The drumlike indicia bearing member 88 may be connected with the rotatable journal member 86, instead of with the armature shaft 79 to eliminate its displacement in axial direction coincident with the actuation of the armature. The drum will in such case only rotate step by step to display its numerals as desired.

The structure may be further modified for use in a numerical counter having a plurality of number wheels. The units number wheel is in this case rotatably journalled and connected with the shaft of the armature by a splined connection in a manner similar as bushing 86 (Fig. 12) is splined with the free end 85 of the shaft 79. In such a case there may be ten peripherally disposed angular teeth on the armature to obtain a 36° angular displacement with each step responsive to current impulses delivered to the stepping magnet. The units number wheel will thus be stepped by angular increments of 36°, or ten steps to each full revolution. The units number wheel may be connected by the well known Geneva movement with the tens number wheel, and the tens number wheel with the hundreds number wheel, etc., to obtain the usual transfer operation of number wheels of higher numerical order in response to ten steps of the number wheel of lower numerical order.

Figure 14:
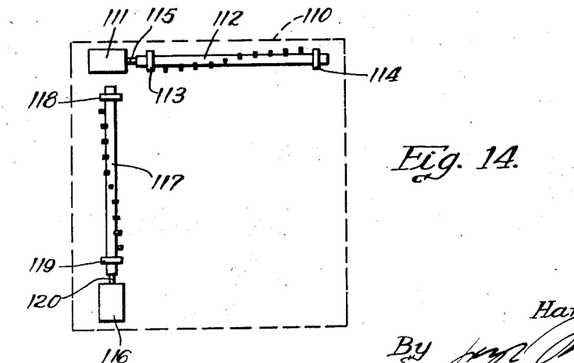
Fig. 14 shows in diagrammatic form how the new device may be used for performing certain mechanical control, coupling or switching functions.

The embodiment indicated in Fig. 14 may be employed for translating the operation of the new magnetic torque ratchet into mechanical work, for example, in the operation of a relay switch of the crossbar or coordinate type disclosed in U. S. application Ser. No. 583,567. The switch is generally indicated by dotted lines marked 110. Numeral 111 indicates a magnetic torque drive mechanism, as already described, for the actuation of the tens select shaft 112. This tens select shaft is provided with a number of angularly displaced longitudinally spaced arms or fingers which project radially therefrom. The shaft 112 may be mounted in bearings 113 and 114 and may be connected with the armature shaft 115 of the magnetic ratchet by a splined connection such as discussed in connection with Figs. 10–13. The tens switch 111 receives the tens impulses and rotates the tens select shaft 112 a corresponding number of steps, to position a desired actuating arm or finger with respect to an associated tens rod so as to couple such rod preparatory to the operation of the gate magnet. The units switch 116 may also be a magnetic torque ratchet switch employing the principles of the present invention, and is adapted to receive units impulses to rotate selectively the units select shaft 117 which is rotatably mounted in bearings 118—119. The units select shaft 117 also carries a number of longitudinally spaced radially projecting angularly displaced fingers or arms which are thus selectively positioned with respect to the units actuators. The armature shaft 120 of the magnetic ratchet switch 116 may be in splined connection with the units select shaft 117. The selective positioning of the arms on the units select shaft serves the purpose of coupling a selected tens rod with the operating means controlled by the gate magnet of the switch 110.

The tens and units select shafts 112 and 117 of the example shown in Fig. 14 are each assumed to be mounted for rotation, and to be in splined connection with the armature shafts 115 and 120, respectively, of their associated magnetic ratchet switches. It is understood, of course, that the shafts 112 and 117 may be mounted for rotation and for axial displacement and that each may be directly connected with the corresponding shaft of the associated magnetic ratchet switch. The coupling of a selected tens or units select rod will then occur responsive to release of the associated armature to normal axial position upon cessation of the last current impulse delivered to the corresponding magnetic ratchet switch. It will likewise be understood that tens and units solenoids may be provided and that such solenoids may be selectively actuated responsive to positioning of contact-actuating fingers relative to associated contacts.

Ten actuating fingers are shown on each of the tens and units select shafts 112 and 117. Additional fingers may be provided for coaction with associated off-normal contacts.

A third magnetic torque switch, such as indicated in Fig. 14 at 111 and 116, respectively, may be employed for digit switching.

It has been assumed in all the embodiments described in the foregoing that the magnetic field of the torque drive device is formed by two pole pieces each forming a plurality of angularly disposed teeth for coaction with the angular teeth of the armature, thus providing two air gaps for the lines of force, as indicated particularly in Fig. 4. It will be seen from this figure that there are at any time four of the teeth of the armature in coacting alignment with corresponding teeth of the pole pieces 36 and 37, respectively. In other words, the magnetic flux will always operatively affect eight of the twelve teeth of the armature.

Figure 15:
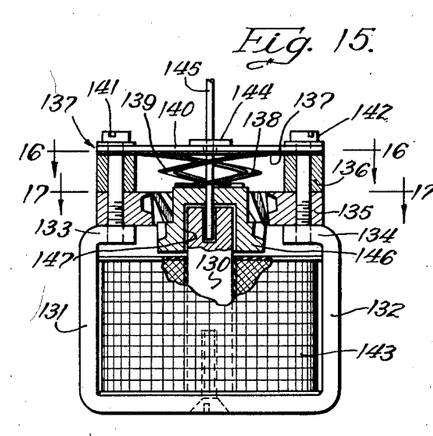
Fig. 15 illustrates a modified embodiment with some parts in section and broken away to indicate details.
Figure 16:
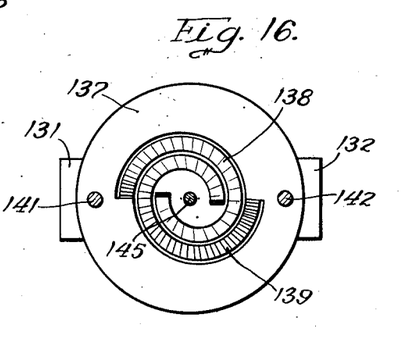
Figs. 16 and 17 are diagrammatic sectional views taken approximately along lines 16—16 and 17—17, respectively, of Fig. 15.
Figure 17:
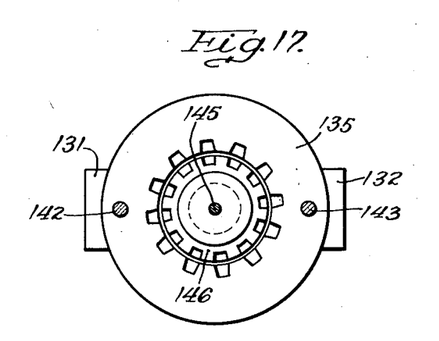

The magnetic flux may be more efficiently utilized by the embodiment indicated in Figs. 15–17, which provides a single circular ring-shaped pole piece forming angularly disposed radially inwardly projecting teeth, the number of which equals the number of teeth carried by the armature, thereby furnishing a structure in which the magnetic flux will always operatively affect all the magnetically coacting teeth carried by the armature and by the pole piece, respectively.

The modified structure comprises a core 130 which is suitably secured to a yoke having two legs 131—132 forming inwardly directed arms 133—134. A single circular generally ring-shaped pole piece 135 is disposed on the arms 133—134. On top of this pole piece is placed a spacer ring 136. A plate 137 is provided, forming two arcuate oppositely coiled leaf springs 138—139. The assembly is held together by a top plate 140 which is connected with the yoke arms 133—134 by means of screws 141—142. A coil 143 is disposed around the core 130, as shown.

The top plate 140 forms or supports a suitable bearing 144 for the shaft 145, and to this shaft is keyed the armature 146. The armature forms a recess 147 for accommodating the free end of the core 130 which is provided with a boring forming a suitable bearing for the lower end of the shaft 145.

The plate 137 is stamped from suitable sheet material and forms the two oppositely coiled springs 138—139 for engagement with the upper end of the armature, thus taking the place of the oppositely coiled coaxial springs 43—44 and 83, respectively, of the previously described structures, biasing the armature 146 axially inwardly and also serving as a detent to control its angular displacement.

The single pole piece 135 has a central opening which is interiorly angularly grooved to form angularly disposed radially inwardly projecting stationary teeth. Twelve such teeth are assumed to be provided, as shown in Fig. 17. The armature 146 is provided with angular grooves forming a like number of radially outwardly projecting angularly directed teeth for magnetic coaction with the teeth of the pole piece. The armature is in normal position axially partially retracted from the circular field formed by the pole piece, and its teeth are aligned with corresponding teeth of the pole piece, in axially overlapping relationship therewith, as in the previous embodiments. The general relationship of the coacting teeth of the armature and of the pole piece, as previously explained, is thus preserved, but there is only one air gap between the armature teeth and the teeth of the pole piece, and the number of teeth carried by the pole piece equals the number of teeth projecting from the armature.

The lines of force of the magnetic flux resulting from the energization of the coil 143 responsive to a current impulse delivered thereto extend from the arms 133—134 of the yoke through the pole piece 135, across the gap between the teeth carried by the armature, through the armature, and thence across the small gap formed by the armature recess 147 to the core 130. All the teeth of the armature are magnetically operatively affected, resulting in more efficient utilization of the magnetic properties and furnishing relatively powerful attraction of the armature.

The operative actuation of the armature responsive to each current impulse delivered to the coil 143 of the device is generally similar to the operation explained in connection with the previously discussed embodiments. The armature is thus similarly displaced in a composite motion, axially (upwardly as seen in Fig. 15) and is at the same time angularly rotated by a definite amount determined by the number of its teeth and the pitch thereof, until it is in its actuated terminal position when its teeth are aligned face-to-face with the respective teeth of the pole piece. Upon cessation of the current impulse, the armature moves to normal position in a straight-line axial motion, and since its teeth were angularly advanced incident to the preceding energization of the coil, they are now placed in preparatory axially overlapping relationship with the angularly successive teeth of the pole piece. Successive current impulses delivered to the coil 143 cause in this manner successive axial displacement and coincident angular step-by-step rotation of the armature.

The device shown in Figs. 15–17 may be used for performing the operations discussed before.

The examples of using the new magnetic ratchet driving device, as presented herein, do not exhaust the possibilities of the invention. The device may be used for numerous additional purposes.

It will therefore be appreciated that changes may be made within the scope and spirit of the appended claims which define what is believed to be new and desired to have protected by Letters Patent of the United States.

I claim:

1. An electromagnetic step-by-step driving device having a stepping magnet comprising a movably mounted generally disklike armature carrying a plurality of radially outwardly pointing axially peripherally disposed angularly directed teeth, a generally platelike pole piece forming an opening, grooves disposed in the wall of said opening of said pole piece forming transversely angularly directed teeth thereon for magnetic coaction with the teeth of said armature, means for resiliently biasing said armature in a direction perpendicular to the plane of said pole piece to maintain it in normal position partially retracted from said pole piece and partially outside the boundaries thereof with its teeth axially aligned with corresponding teeth of said pole piece but radially separated therefrom by an air gap, and means for energizing said stepping magnet to create flux across the gap between the teeth of said pole piece and the teeth of said armature for the purpose of causing said armature to move from its normal position to operated terminal position in a composite motion perpendicular to the plane of said pole piece and simultaneously angularly with respect thereto to dispose its teeth across said air gap in face-to-face alignment with corresponding teeth of said pole piece, said biasing means being operative upon deenergization of said stepping magnet to restore said armature to normal in a straight-line motion perpendicular to the plane of said pole piece.

2. The structure and combination defined in claim 1, wherein said resilient biasing means is also operative as a detent to control the angular displacement of said armature responsive to repeated energization of said stepping magnet.

3. An electromagnetic stepping device comprising a generally platelike pole piece having a cutout forming an inner wall extending perpendicular to its plane and carrying angularly disposed inwardly directed teeth, a rotatably mounted platelike generally cylindrical armature forming peripherally disposed angularly directed teeth for magnetic coaction with the teeth of said pole piece, an operating member connected with said armature, means for resiliently axially biasing said armature to dispose it in a normal position partially axially retracted from the field of said pole piece and partially outside the boundaries thereof, and a coil for energizing said pole piece to create flux which effects displacement of said armature in a composite axially and simultaneously angularly by increments determined by the relationship between the teeth of said armature and the teeth of said pole piece for the purpose of axially displacing and angularly advancing said operating member, said resilient biasing means being effective upon cessation of the energization of said coil to move said armature to normal position in a straight-line axial motion so as to position said operating member in accordance with the angular advancement thereof.

4. The structure and combination defined in claim 3, wherein said resilient biasing means has the dual function, namely, first, of biasing said armature axially to determine its normal position as defined and, second, of operating in the nature of a detent which holds said armature in position against inadvertent angular displacement thereof.

5. In a contact switching device of the class described, a magnet having a core surrounded by an energizing coil, a plate-like pole piece connected at one end fixedly with said core, the body of said pole piece overlying said coil and its free end forming a plurality of arcuately disposed individual pole teeth extending at an angle to its general plane, a generally disklike armature forming a plurality of peripherally disposed individual pole teeth extending at an angle to its general plane, means for mounting said armature for rotation and for axial displacement relative to said pole piece and with its teeth separated by a radial air gap from the teeth of said pole piece, a shaftlike actuating member extending from said armature perpendicular to the plane thereof, actuating fingers carried by said actuating member, said actuating fingers projecting radially from said actuating member and being axially uniformly spaced thereon, nonuniformly spaced sets of contact springs disposed alongside said actuating member, extensions carried by some of the contact springs of each set and projecting laterally therefrom toward said shaftlike actuating member, said extensions being crimped with respect to the plane of the corresponding springs to form uniformly spaced operating members for coaction with said uniformly spaced actuating fingers carried by said actuating member, said energizing coil being operative upon the application of current impulses thereto to set up a magnetic flux between said pole piece and armature, and thereby successively rotate and simultaneously axially move said armature and therewith said actuating member with its actuating fingers to position predetermined actuating fingers selectively relative to predetermined operating members formed by the crimped extensions of said springs.

6. In combination, a magnet having a core surrounded by an energizing coil, a platelike pole piece rigidly connected at one end with said core and having at its free end an inner face forming a plurality of arcuately disposed individual pole teeth extending at an angle to its general plane, a generally disklike armature forming a plurality of peripherally disposed individual pole teeth extending at an angle to its general plane, means for mounting said armature for rotation and for axial displacement relative to said pole piece and with its teeth separated by an air gap from the teeth of said pole piece, a shaftlike carrier member extending from said armature perpendicular to the plane thereof, an operating member, a relatively fixedly mounted member disposed in a position radially spaced from said shaftlike carrier member, said energizing coil being operative upon the application of current impulses thereto to set up a magnetic flux between said pole piece and armature, and thereby successively rotate and simultaneously axially move said armature and therewith said carrier member to position said operating member selectively with respect to said relatively fixedly mounted member.

7. In a magnetically actuated switching device of the class described, a magnet having a core surrounded by an energizing coil, an integral platelike yoke of magnetizable material, means for rigidly connecting said yoke with one end of said core, the body of said yoke extending toward the other end of said core and forming a pole face thereat which is arcuately inwardly formed, angularly directed teeth formed on and projecting outwardly from the arcuate pole face of said yoke, mounting means on said yoke overlying the arcuate toothed pole face thereof, a shaft journalled in said mounting means for rotation and for axial displacement relative thereto, an integral circular disklike member of magnetizable material carried by said shaft, said disklike member being provided along its periphery with axially angularly extending grooves to form an armature having radially outwardly directed axially angularly extending teeth for magnetic coaction with the teeth projecting from the arcuate face of said yoke, means for axially resiliently biasing said armature and said shaft to place said armature in a normal position partially axially retracted from said arcuate toothed pole face of said yoke, said energizing coil being operative upon the application of successive current impulses thereto to set up magnetic flux between the teeth of said pole face and the teeth of said armature for the purpose of successively angularly rotating said armature and said shaft by angular increments determined by the configuration of said teeth carried by said armature and by said arcuate pole face and for axially moving said armature and said shaft incident to each angular rotation, said biasing means following deenergization of said coil, causing said armature and said shaft to return after each angular and coincident axial displacement in a straight-line axial motion into axial normal position, actuating means carried by said shaft, and operating means actuated by said actuating means incident to restoration of said armature and shaft to normal axial position.

8. The structure defined in claim 7, wherein said resilient biasing means comprises a pair of concentrically arranged spring means acting in opposite angular direction and exerting pressure on said armature and associated shaft in identical axial direction.

9. In a magnetically actuated device of the class described, a substantially cylindrical armature, means supporting said armature for free rotative movement about its axis and free axial reciprocation through a desired range of travel, means operatively exerting a biasing force on said armature to normally position the latter at one end of its operative axial travel, an electromagnetic structure including an energizing coil and a paramagnetic pole piece operatively related thereto, said pole piece being so positioned adjacent to said armature that the latter, when in its biased position, is within the magnetic field produced by said pole piece during energization of said coil, with such field operable to axially move said armature in a direction toward the opposite end of its operative axial travel in opposition to said biasing force, and cooperable flux-guiding means on said pole piece and armature for translating a portion of the magnetic flux produced, acting in an axial direction on said armature, into a torque force thereon operative to rotate said armature through a predetermined fraction of one complete revolution simultaneously with axial movement of said armature resulting from the magnetic forces applied thereto, said biasing means being operable, upon the deenergization of said magnetic field to return said armature in a straight-line axial movement to its initial axial position.

10. The structure defined in claim 9, wherein said biasing means comprises a pair of concentrically arranged spring means acting in opposite angular direction and exerting pressure on said armature and associated shaft in identical axial direction.

11. In a magnetically actuated device of the class described, a substantially cylindrical armature, means supporting said armature for free rotative movement about its axis and free axial reciprocation through a desired range of travel, means operatively exerting a biasing force on said armature to normally position the latter at one end of its operative axial travel, an electromagnetic structure including an energizing coil and a paramagnetic pole piece operatively related thereto, said pole piece being so positioned adjacent to said armature that the latter, when in its biased position, is within the magnetic field produced by said pole piece during energization of said coil, with such field operable to axially move said armature in a direction toward the opposite end of its operative axial travel in opposition to said biasing force, cooperable flux-guiding means on said pole piece and armature for translating a portion of the magnetic flux produced, acting in an axial direction on said armature, into a torque force thereon operative to rotate said armature through a predetermined fraction of one complete revolution simultaneously with axial movement of said armature resulting from the magnetic forces applied thereto, said biasing means being operable, upon the deenergization of said magnetic field to return said armature in a straight-line axial movement to its initial axial position, an actuating member operatively related to and movable with said armature, and operating means operatively related to said actuating member and actuated by the biasing force of said biasing means, transmitted to said operating means by said actuating member incident to the restoration of said armature to its initial axial position.

12. The structure defined in claim 11, wherein said biasing means comprises a pair of concentrically arranged spring means acting in opposite angular direction and exerting pressure on said armature and associated shaft in identical axial direction.

HANS P. BOSWAU.

References Cited in the file of this patent

UNITED STATES PATENTS

| Number | Name | Date |
|---|---|---|
| 351,388 | Mather | Oct. 26, 1886 |
| 700,839 | Sessions | May 27, 1902 |
| 913,080 | Weman | Feb. 23, 1909 |
| 1,085,721 | Berdon | Feb. 3, 1914 |
| 1,110,027 | Aitken | Sept. 8, 1914 |
| 1,462,251 | Slough | July 17, 1923 |
| 1,479,834 | Reynolds | Jan. 8, 1914 |
| 1,562,730 | Andrews | Nov. 24, 1925 |
| 1,696,368 | Strouse | Dec. 25, 1928 |
| 1,802,459 | Caruso | Apr. 28, 1931 |
| 1,852,677 | Reynolds | Apr. 5, 1932 |
| 1,911,960 | Lipman | May 30, 1933 |
| 1,997,655 | Sanford et al. | Apr. 16, 1935 |
| 2,090,315 | Thomas | Aug. 17, 1937 |
| 2,135,506 | Hansch et al. | Nov. 8, 1938 |
| 2,156,465 | Vigren et al. | May 2, 1939 |
| 2,209,214 | Wallace | July 23, 1940 |
| 2,279,220 | Baum | Apr. 7, 1942 |
| 2,289,227 | Walker | July 7, 1942 |
| 2,327,792 | Hubbard | Aug. 24, 1943 |
| 2,371,511 | Faus | Mar. 13, 1945 |
| 2,433,920 | Mossman | Jan. 6, 1948 |
| 2,462,495 | Harrison, Jr. | Feb. 22, 1949 |
| 2,475,331 | Loundes | July 5, 1949 |
| 2,496,880 | Leland | Feb. 7, 1950 |

FOREIGN PATENTS

| Number | Country | Date |
|---|---|---|
| 566,778 | Great Britain | Jan. 12, 1945 |
| 671,854 | France | Dec. 19, 1929 |
| 517,084 | France | Apr. 29, 1921 |